United States Patent [19]

Clark et al.

[11] Patent Number: 4,730,335
[45] Date of Patent: Mar. 8, 1988

[54] SOLID STATE LASER AND METHOD OF MAKING

[75] Inventors: John H. Clark, Wheaton; Dennis L. Werth, Indian Head Park, both of Ill.

[73] Assignee: Amoco Corporation, Chicago, Ill.

[21] Appl. No.: 879,149

[22] Filed: Jun. 26, 1986

[51] Int. Cl.$^4$ ................................................ H01S 3/08
[52] U.S. Cl. ........................................ 372/98; 372/107; 372/71; 372/75; 372/21; 372/101
[58] Field of Search .................... 372/108, 62, 107, 65, 372/92, 40, 70, 71, 21

[56] References Cited

U.S. PATENT DOCUMENTS

| | | |
|---|---|---|
| 4,037,172 | 7/1977 | Filipescu et al. ........................ 372/40 |
| 4,045,129 | 8/1977 | Hamar ...................................... 372/65 |
| 4,509,175 | 4/1985 | Daly et al. ............................... 372/62 |
| 4,525,842 | 6/1985 | Myers ....................................... 372/92 |
| 4,656,635 | 4/1987 | Baer et al. .............................. 372/108 |

Primary Examiner—Leon Scott, Jr.
Attorney, Agent, or Firm—Richard A. Kretchmer; William H. Magidson; Ralph C. Medhurst

[57] ABSTRACT

An optically pumped solid state laser which is constructed of components having attached fittings which are structured in such a manner that the components are automatically arranged with respect to one another along an optical path upon joining the fittings together.

25 Claims, 4 Drawing Figures

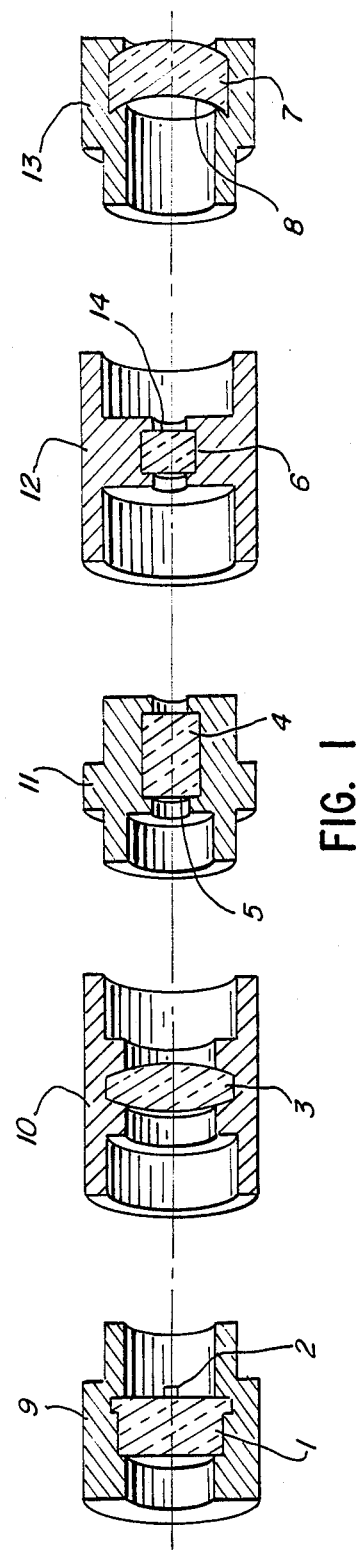
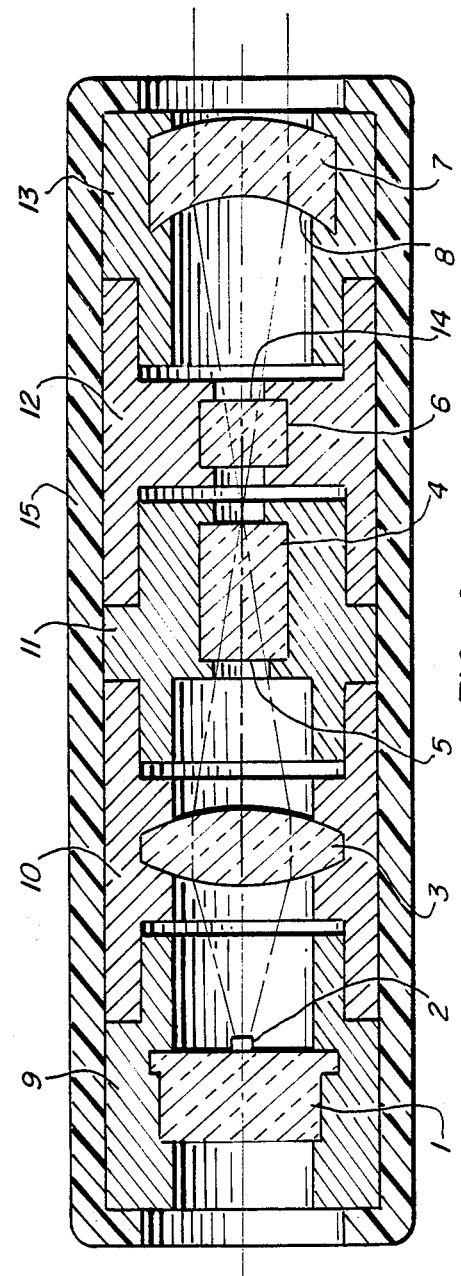
FIG. 1
FIG. 2

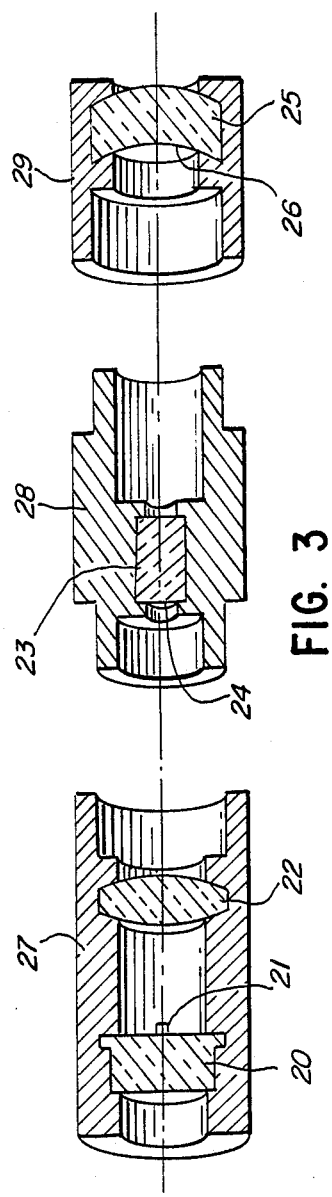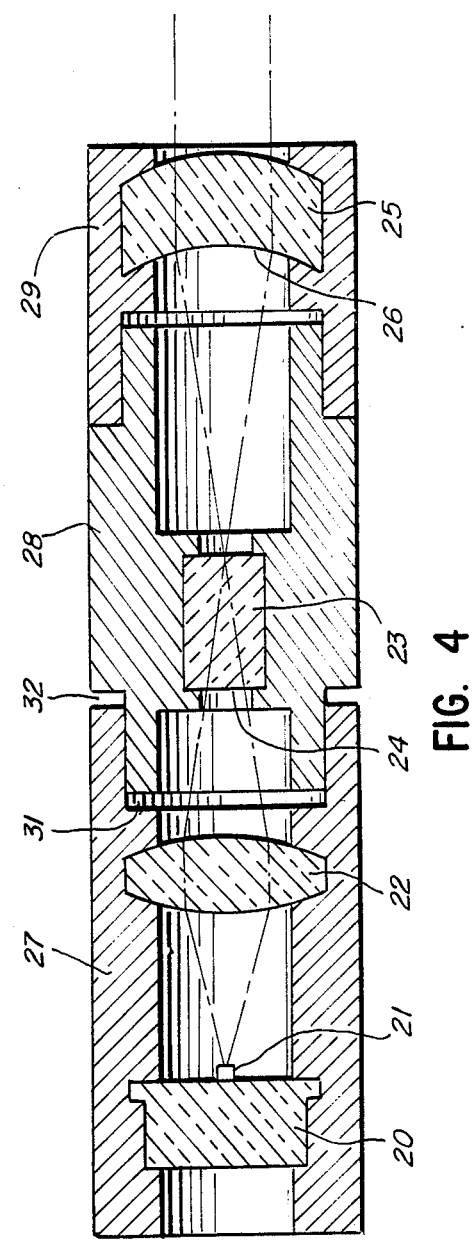

SOLID STATE LASER AND METHOD OF MAKING

BACKGROUND OF THE INVENTION

1. Field of the Invention

This invention relates to an optically pumped solid state laser and a method for its manufacture. More particularly, it relates to such a laser which is constructed of components having attached fittings which are structured in such a manner that the components are automatically arranged with respect to one another along an optical path upon joining the fittings together.

2. Description of the Prior Art

During the period of time since the first operating laser was demonstrated in 1960, laser development work has resulted in a wide variety of lasers in terms of size, power, output frequency, active medium (lasant material) and method of excitation. For the most part, these devices can be classified as precision instruments and are typically handmade by skilled craftsmen. Features which such devices share in common include a resonator, a pump source (a source of energy to either create or activate the lasant material), and means for removing heat. Aside from solid state semiconductor laser diodes, such as those based on gallium arsenide and gallium aluminum arsenide, most of the currently available lasers are based on gas-discharge technology and are both large and inefficient. Such gas-discharge technology involves either the direct use of a gas discharge, as in a carbon dioxide laser, or the indirect use of a gas discharge, as in a flash lamp which is used to excite a lasant material.

When the optical components of a laser are relatively far apart (about 15 to 800 cm in conventional lasers), small angular misalignments result in substantial losses in laser output power. Accordingly, laser resonators are designed to ensure the maintenance of a stable orientation of these optical components. This design requirement has dictated the use of highly rigid materials such as Invar, glass, granite, steel and various ceramics for resonator construction.

Heat which is produced as an undesired by-product of laser operation has also placed constraints on the design of laser resonators. Temperature fluctuations produced by such heat result in thermally induced distortions of the resonator and associated misalignment of the optical components within the resonator. Accordingly, conventional laser designs have addressed this problem through the use of materials having a low coefficient of thermal expansion, such as Invar, quartz and various ceramics, and also by using external cooling means to thermally stabilize the resonator.

The use of flashlamps, light-emitting diodes, laser diodes and laser diode arrays to optically pump or excite a solid lasant material is well known. Lasant materials commonly used in such solid state lasers include crystalline or glassy host materials into which an active material, such as trivalent neodymium ions, is incorporated. Conventional host materials for neodymium ion include glass and yttrium aluminum garnet (referred to as YAG). By way of example, when neodymium-doped YAG is employed as the lasant material in an optically pumped solid state laser, it is typically pumped by absorption of light having a wavelength of about 810 nm and emits light having a wavelength of 1,064 nm.

U.S. Pat. No. 3,624,545 issued to Ross on Nov. 30, 1971, describes an optically pumped solid state laser composed of a YAG rod which is side-pumped by at least one semiconductor laser diode. Similarly, U.S. Pat. No. 3,753,145 issued to Chesler on Aug. 14, 1973, discloses the use of one or more light-emitting semiconductor diodes to end pump a neodymium-doped YAG rod. The use of an array of pulsed laser diodes to end pump a solid lasant material such as neodymium-doped YAG is described in U.S. Pat. No. 3,982,201 issued to Rosenkrantz et al. on Sept. 21, 1976. Finally, D. L. Sipes, *Appl. Phys. Lett.*, Vol. 47, No. 2, 1985, pp. 74–75, has reported that the use of a tightly focused semiconductor laser diode array to end pump a neodymium-doped YAG results in a high effeciency conversion of pumping radiation having a wavelength of 810 nm to output radiation having a wavelength of 1,064 nm.

Materials having nonlinear optical properties are well known and have the ability to function as harmonic generators. For example, U.S. Pat. No. 3,949,323 issued to Bierlen et al. on Apr. 6, 1976, discloses the use as second harmonic generators of materials having the formula $MTiO(XO_4)$ where M is at least one of K, Rb, Tl and $NH_4$; and X is at least one of P or As, except when $NH_4$ is present then X is only P. This generic formula includes potassium titanyl phosphate, $KTiOPO_4$, a particularly useful nonlinear material. Other known nonlinear optical materials include, but are not limited to, $KH_2PO_4$, $LiNbO_3$, $KNbO_3$, $LiIO_3$, $HIO_3$, $KB_5O_8.4H_2O$ and urea. A review of the nonlinear optical properties of a number of different uniaxial crystals has been published in *Sov. J. Quantum Electron.*, Vol. 7, No. 1, January 1977, pp. 1–13.

Nonlinear optical materials can be utilized to frequency double the output radiaton of a solid state laser. For example, it has been reported by R. F. Belt et al., *Laser Focus/Electro-Optics*, October 1985, pp. 120–121, that potassium titanyl phosphate can be utilized to frequency double the 1,064 nm output of a neodymium-doped YAG laser to afford light having a wavelength of 532 nm.

U.S. Pat. No. 4,526,444 issued to Fantone et al. on July 2, 1985, is directed to a viewfinder assembly which is fabricated virtually exclusively of injection molded plastics. Various optical components of the viewfinder are structured to snap-fit together inside a housing. More specifically, both the lens components and the housing are provided with complementary configured snap-type connectors which allow quick assembly and automatic positioning of the lens components with respect to each other. However, the viewfinder described in this patent is a passive optical system which does not generate light or heat. There is no teaching or suggestion in the patent that the active optical system of an optically pumped solid state laser could be assembled using complementary configured connectors of any type.

SUMMARY OF THE INVENTION

The present invention is directed to the discovery that an optically pumped solid state laser which is rugged, lightweight and compact can be easily constructed through the use of components which have complementary configured fittings attached to them. For the purposes hereof, a "laser component" means an optical pump and output coupler together with any intermediate active or passive optical elements and any ancillary packaging for these elements, said elements including a gain medium and any focusing and nonlinear optical elements, but excluding any power supply for the optical pump. It will be appreciated, of course, that the output coupler comprises the mirror which defines the end of the laser resonator or cavity.

One embodiment of the invention is an optically pumped laser which is comprised of solid state components which have attached thereto complementary configured fittings structured so that said components are automatically arranged with respect to one another along an optical path upon joining said fittings.

Another embodiment of the invention is a method for making an optically pumped solid state laser which comprises: (a) attaching fittings to the components of said laser, said fittings being structured so that said components are automatically arranged with respect to one another along an optical path within predetermined tolerances upon joining said fittings; (b) joining the fittings together, thereby placing said components in operative association; and (c) bonding said fittings to each other.

An object of this invention is to provide an improved optically pumped solid state laser.

Another object of this invention is to provide an optically pumped solid state laser which is compact in size.

Another object of this invention is to provide an optically pumped solid state laser which is lightweight.

Another object of this invention is to provide an optically pumped solid state laser which is relatively insensitive to shock.

Another object of the invention is to provide a method for the easy assembly of an optically pumped solid state laser.

A further object of the invention is to provide an optically pumped solid state laser which can be assembled from components having injection molded fittings attached to them.

A further object of the invention is to provide an optically pumped solid state laser which can be constructed, at least in part, from materials such as plastics which have a relatively high coefficient of thermal expansion and a relatively low modulus of elasticity.

A further object of the invention is to provide a method for the mass production of optically pumped solid state lasers.

A still further object of the invention is to provide a method for the use of injection molding techniques in the manufacture of optically pumped solid state lasers.

BRIEF DESCRIPTION OF THE DRAWINGS

FIG. 1 of the drawings is a perspective view of an exploded cross section of an embodiment of this invention.

FIG. 2 of the drawings is a cross section of the same embodiment of this invention as set forth in FIG. 1 which is enclosed in a housing.

FIG. 3 of the drawings is a perspective view of an exploded cross section of another embodiment of this invention.

FIG. 4 of the drawings is a cross section of the same embodiment of this invention as set forth in FIG. 3.

DETAILED DESCRIPTION OF THE PREFERRED EMBODIMENTS

While this invention is susceptible of embodiment in many forms, there is shown in FIGS. 1-4 two specific embodiments, with the understanding that the present disclosure is not intended to limit the invention to the embodiments illustrated.

Except for housing 15 shown in FIG. 2, FIGS. 1 and 2 of the drawings illustrate a single embodiment of the optically pumped laser of this invention which has a substantially cylindrical configuration. FIG. 1 is a perspective view of an exploded cross section of this embodiment, whereas FIG. 2 is a cross section.

With reference to FIGS. 1 and 2, light from an optical pumping means, which consists of elements 1 and 2, is focused by lens 3 onto lasant material 4 which has a suitable reflective coating on surface 5 and is capable of being pumped by the light from said pumping means (1 and 2). The reflective coating on surface 5 is highly transparent with respect to light produced by the pumping means (1 and 2) but is highly reflective with respect to light produced by the lasing of lasant material 4. Light emitted by the lasing of lasant material 4 is passed through nonlinear optical material 6 to output coupler 7 which has a suitable reflective coating on surface 8 which is highly reflective with respect to light emitted by lasant material 4 but substantially transparent to frequency-modified light produced by nonlinear optical material 6. Output coupler 7 is configured in such a manner that it serves to collimate the output radiation from the laser which passes through it.

Each of the components of the laser, optical pumping means (1 and 2), lens 3, lasant material 4, nonlinear optical material 6 and output coupler 7, has a fitting 9, 10, 11, 12 and 13, respectively, attached to it. These fittings are configured in a complementary manner so that when fitted together the laser components are automatically arranged with respect to one another along an optical path.

Suitable optical pumping means include, but are not limited to, laser diodes, light-emitting diodes and laser diode arrays, together with any ancillary packaging or structures. For the purposes hereof, the term "optical pumping means" includes any heat sink or packaging associated with said laser diodes, light-emitting diodes and laser diode arrays but excludes any associated power supply. For example, such devices are commonly attached to a heat resistant and conductive heat sink and are packaged in a metal housing. A highly suitable optical pumping source consists of a gallium aluminum arsenide laser diode 2 emitting light having a wavelength of about 810 nm, which is attached to heat sink 1. Heat sink 1 can be passive in character. However, heat sink 1 can also comprise a thermoelectric cooler to help maintain laser diode 2 at a constant temperature and thereby ensure optimal operation of laser diode 2. It will be appreciated, of course, that during operation the optical pumping means will be attached to a suitable power supply. Electrical leads from laser diode 2 which are directed to a power supply are not illustrated in FIGS. 1 and 2.

Lens 3 serves to focus light from laser diode 2 onto lasant material 4. This focusing results in a high pumping intensity and an associated high photon to photon conversion efficiency in lasant material 4. Any conventional optical means for focusing light can be used in place of simple lens 3. For example, a gradient index lens, a ball lens, an aspheric lens or a combination of lenses can be utilized. It will be appreciated, however, that lens 3 is not essential to the laser of this invention and the use of such focusing means merely represents a preferred embodiment.

Any conventional lasant material 4 can be utilized provided that it is capable of being optically pumped by the optical pumping means selected. Suitable lasant materials include, but are not limited to, materials selected from the group consisting of glassy and crystalline host materials which are doped with an active material. Highly suitable active materials include, but are not limited to, ions of chromium, titanium and the rare earth metals. By way of specific example, neodymium-doped YAG is a highly suitable lasant material 4 for use in combination with an optical pumping means which produces light having a wavelength of 810 nm. When pumped with light of this wavelength, neodymium-doped YAG can emit light having a wavelength of 1,064 nm.

Lasant material 4 is shown as a rod in FIGS. 1 and 2. However, it will be appreciated that the precise geometric shape of this component can vary widely. For example, the lasant material can have lens-shaped surfaces or be rhombohedral in shape if desired. Although not illustrated in the drawings, a preferred embodiment of the invention involves the use of a fiber of lasant material which is end-pumped by the optical pumping means. Highly suitable fibers for this purpose include, but are not limited to, glass optical fibers which are doped with ions of a rare earth metal such as neodymium. The length of such a fiber is easily adjusted to result in absorption of essentially all of the light from the optical pumping means. If a very long fiber is required, it can be coiled, on a spool for example, in order to minimize the overall length of the laser of this invention.

Lasant material 4 has a reflective coating on surface 5. This coating is conventional in character and is selected so that it transmits as much as possible of the incident pumping radiation from laser diode 2 while being highly reflective with respect to the radiation produced by lasing of lasant material 4. In a preferred embodiment, this coating will also be highly reflective of the second harmonic of the radiation produced by lasing of lasant material 4. High reflectivity of this second harmonic will serve to prevent the pump-side loss of any frequency doubled radiation which is produced by nonlinear optical material 6 upon reflection of light, which is not frequency doubled, back through nonlinear optical material 6 by the coating on surface 8.

For a neodymium-doped YAG rod 4 which is pumped with light having a wavelength of 810 nm, the coating on surface 5 should be substantially transparent to said 810 nm light and highly reflective with respect to light having a wavelength of 1,064 nm. In a highly preferred embodiment, this coating will also be highly reflective of light having a wavelength of 532 nm, the second harmonic of the aforementioned 1,064 nm light. It will be appreciated, of course, that the wavelength selective mirror which is created by the coating on surface 5 need not be located on said surface. If desired, this mirror can be located anywhere between the optical pumping means and the lasant material, and can consist of a coating deposited on any suitable substrate. In addition, the mirror can be of any suitable shape.

Light emitted by the lasing of lasant material 4 is passed through nonlinear optical material 6. By proper orientation of the crystal structure of the nonlinear optical material 6 with respect to the incident light produced by lasant material 4, the frequency of the incident light can be modified, for example, doubled or tripled, by passage through nonlinear optical material 6. By way of specific example, light having a wavelength of 1,064 nm from a neodymium-doped YAG lasant material 4 can be converted to light having a wavelength of 532 nm upon passage through nonlinear optical material 6. Although nonlinear optical material 6 is shown as a rod in FIGS. 1 and 2, it will be appreciated that the geometric shape of this component can vary widely. For example, the nonlinear optical material can have lens-shaped surfaces or be rhombohedral in shape if desired. It will also be appreciated that any such nonlinear optical component can comprise heating or cooling means to control the temperature of said nonlinear optical material and thereby optimize its performance as a harmonic generator.

Potassium titanyl phosphate is a highly preferred nonlinear optical material. However, it will be appreciated that any of the many known nonlinear optical materials can be utilized in the practice of this invention. Such known nonlinear optical materials include, but are not limited to, $KH_2PO_4$, $LiNbO_3$, $KNbO_3$, $LiIO_3$, $HIO_3$, $KB_5O_8.4H_2O$, urea and compounds of the formula $MTiO(XO_4)$ where M is selected from the group consisting of K, Rb and Tl, and X is selected from the group consisting of P and As. It will also be appreciated that nonlinear optical material 6 is not an essential laser component and its use merely represents one embodiment of this invention.

As a consequence of the fact that nonlinear optical material 6 is not 100 percent efficient as a second harmonic generator, light passed through this component from lasant material 4 will ordinarily consist of a mixture of frequency doubled light and unmodified light. In the case of light having a wavelength of 1,064 nm from neodymium-doped YAG as the lasant material 4, the light passed through nonlinear optical material 6 will be a mixture of 1,064 nm and 532 nm wavelengths. This mixture of wavelengths is directed to output coupler 7 which has a reflective coating on surface 8 which is wavelength selective. This coating is conventional in character and is selected in such a manner that it is substantially transparent to the 532 nm light but highly reflective with respect to the 1,064 nm light. Accordingly, essentially only frequency doubled light having a wavelength of 532 nm is emitted through the output coupler.

The wavelength selective mirror which is created by the coating on surface 8 need not be of the precise design illustrated in FIGS. 1 and 2 and can be of any conventional form. For example, the wavelength selective mirror can be created by a coating on surface 14 of nonlinear optical material 6. In this event, output coupler 7 could be either eliminated or replaced by optical means whose sole purpose is to collimate or otherwise modify the output radiation from the laser. However, the concave shape of the mirror created by the coating on surface 8 has the advantage of focusing reflected light, which has not been frequency doubled, back onto nonlinear optical material 6, through lasant material 4 and onto the coating on surface 5. As set forth above, in a preferred embodiment, this coating on surface 5 is highly reflective of both frequency doubled and unmodified light from the lasing of lasant material 4. Accordingly, frequency-unmodified light reflected by the coating on surface 8 is partially frequency doubled by passage through nonlinear optical material 6, the resulting mixture of wavelengths is reflected from the coating on surface 5 back through nonlinear optical material 6 where some of the residual frequency-unmodified light is frequency doubled, and the frequency doubled light is emitted through output coupler 7. Except for losses which may occur as a result of processes such as scattering or absorption, further repetition of this series of events results in essentially all of the light produced by the lasing of lasant material 4 being frequency doubled and emitted through output coupler 7.

Fittings 9, 10, 11, 12 and 13 are structured so that when fitted together, the various components of the laser are automatically arranged with respect to each other along an optical path. Fittings 9 and 11 are configured to fit into complementary recesses in fitting 10. Similarly, fittings 11 and 13 are configured to fit into complementary recesses in fitting 12. The fittings are preferably configured so that the laser components are arranged with respect to each other within predetermined tolerances upon joining said fittings. If desired, these tolerances can be relatively large so that the components are arranged at substantially correct distances from each other with optimization of laser performance being achieved by empirical adjustment of the final spacing between the components. For example, fittings 9 and 10 are shown in FIG. 2 as fitting tightly together. However, if desired, fittings 9 and 10 can be configured so that this tight fit positions diode laser 2 at a substantially correct distance from lens 3 with optimization of this distance being carried out empirically by moving fittings 9 and 10 slightly apart from each other until optimum laser performance is achieved. A highly preferred embodiment of the invention involves the use of fittings which are configured so that the laser components are arranged in operative association with respect to one another along an optical path within predetermined tolerances upon joining said fittings.

The fittings 9, 10, 11, 12 and 13 can be bonded together, if desired, using any conventional technique or combination of techniques. For example, the fittings can be welded or bonded together with one or more adhesives or bonding agents. Alternatively, the assembled fittings and associated laser components can be enclosed within a housing which holds the fittings together. For example, a metal, plastic or ceramic housing can be used. Indeed, a highly preferred embodiment of the invention comprises the use of an injection molded plastic housing. A substantially tubular housing 15 is illustrated in FIG. 2. The fittings 9, 10, 11, 12 and 13 can also be bonded together through the use of snap-type connecting means or other fastening means incorporated into or onto the fittings themselves. By way of example, the fittings can be provided with screw threads so that they can be screwed together and held together by the screw threads.

Fittings 9, 10, 11, 12 and 13 fit together to form a substantially tubular structure around the various laser components. It will be appreciated, however, that this is merely one embodiment of the invention, and the fittings of this invention can be of any convenient shape or configuration. For example, the fittings need not surround the laser components on all but two sides as shown in FIGS. 1 and 2. If desired, the fittings can be designed to form a substantially flat platform, a tray or a trough when fitted together. It will be appreciated that the precise shape and configuration of the fittings will frequently be dictated by considerations of manufacturing convenience and intended use of the assembled laser.

The fittings of this invention can be composed of any suitable rigid material, such as metals, ceramics, glass, thermoplastic materials and thermosetting materials. In addition, the fittings can be fabricated by any conventional technique. For example, metal fittings can be fabricated by machining or die casting, and die cast aluminum fittings are particularly satisfactory. A highly preferred embodiment of the invention involves the use of fittings which are comprised of one or more thermoplastic materials. Suitable thermoplastic materials include, but are not limited to, polyvinyl chloride, nylons, fluorocarbons, linear polyethylene, polyurethane prepolymer, polystyrene, polypropylene, and cellulosic and acrylic resins. If desired, composites of such thermoplastic materials with various fibers or other strengthening agents can also be employed. Thermoplastic and glass fittings can be conveniently fabricated by injection molding techniques. For example, a fitting can be attached to a laser component by the simple expedient of injection molding the fitting around the component. Indeed, if a suitable glass or thermoplastic material is selected, certain passive optical components of the laser and associated fittings can be injection molded as single units. Such passive optical components include any lenses employed and, by way of example, lens 3 and its fitting 10 can be fabricated as a single unit from the same glass or thermoplastic material.

If desired, a single fitting can be fabricated in two or more segments which are then assembled about the associated laser component. For example, fitting 10 can be fabricated in two halves from die cast aluminum or an injection molded thermoplastic. These two halves can then be fitted together around lens 3 and bonded to each other by any suitable method to give lens 3 having fitting 10 attached to it.

The optically pumped solid state laser of this invention can be of essentially any size, but is preferably very small. For example, the overall length of the assembled fittings of the various laser components is desirably less than about 20 cm, preferably less than about 10 cm and more preferably less than about 5 cm. As a consequence of such relatively small sizes, plastics become highly suitable for use in constructing fittings for the laser components. Upon assembly, these plastic fittings result in formation of a plastic structure which holds the various laser components in relationship to each other. At these relatively small sizes, the relatively poor rigidity and thermal expansion properties of plastics are essentially irrelevant.

FIGS. 1 and 2 illustrate one embodiment of the invention wherein each laser component, 1 and 2, 3, 4, 6 and 7 is attached to a separate fitting, 9, 10, 11, 12 and 13, respectively. It will be appreciated, however, that a single fitting can have more than one laser component attached to it. For example, fittings 10 and 11 can be combined with the result that lens 3 and lasant material 4 are attached to the same fitting. The number of laser components attached to a given fitting will typically be determined by considerations of manufacturing convenience and economy.

FIGS. 3 and 4 illustrate another single embodiment of the invention which also has a substantially cylindrical configuration. FIG. 3 is a perspective view of an exploded cross section of this embodiment, whereas FIG. 4 is a cross section.

With reference to FIGS. 3 and 4, light from an optical pumping means, which consists of elements 20 and 21, is focused by lens 22 onto lasant material 23 which has a suitable reflective coating on surface 24 and is capable of being pumped by the light from said pumping means (20 and 21). The reflective coating on surface 24 is highly transparent with respect to light from pumping means (20 and 21) but is highly reflective with respect to light produced by the lasing of lasant material 23. Light emitted by the lasing of lasant material 23 is directed to output coupler 25 which has a suitable reflective coating on surface 26 and is configured to collimate the light passing through it.

The reflective coating on surface 26 is selected so that it will transmit some, but not all, of the light emitted by the lasing of lasant material 23. For example, the coating on surface 26 can have a reflectivity of about 95 percent with respect to the light emitted by lasant material 23. Suitable reflective coatings for use on surfaces 24 and 26 are conventional in the art.

Optical pumping means (20 and 21) and lens 22 are both attached to a single fitting 27, lasant material 23 is attached to fitting 28 and output coupler 25 is attached to fitting 29. Fittings 27, 28 and 29 are configured in a complementary manner so that when fitted together the laser components are automatically arranged along an optical path. Fittings 28 and 29 are configured so that when tightly fitted together, output coupler 25 is substantially correctly positioned with respect to lasant material 23. However, the positioning of lens 22 with respect to lasant material 23 is empirically optimized by slight movement of fittings 27 and 28 with respect to each other, resulting in gaps 31 and 32. In a preferred embodiment of this invention, the fittings are structured to arrange the various laser components with respect to each other within predetermined tolerances upon joining the fittings together. In a highly preferred embodiment of the invention, these tolerances are sufficiently small that the laser components are automatically arranged in operative association upon joining the fittings.

Upon assembly, the fittings 27, 28 and 29 can be bonded together using any desired conventional technique. For example, suitable techniques are described above in the description of the embodiment of this invention which is illustrated by FIGS. 1 and 2.

By way of specific illustration, the optical pumping means consists of a heat sink 20 and a gallium aluminum arsenide laser diode 21 which emits light having a wavelength of 810 nm. Electrical leads from laser diode 21 which are directed to a power supply are not illustrated in FIGS. 3 and 4. Light from laser diode 21 is focused by lens 22 onto a rod of neodymium-doped YAG 23 which emits light having a wavelength of 1,064 nm, and light of this wavelength is released from the laser through output coupler 25 in a collimated or otherwise appropriately divergent beam.

In comparison with the embodiment of FIGS. 1 and 2, the embodiment of FIGS. 3 and 4 differs in that: (a) it does not utilize a nonlinear optical material [6 in FIGS. 1 and 2]; (b) optical pumping means [20 and 21] and lens 22 of FIGS. 3 and 4 are attached to a single fitting 27, whereas optical pumping means [1 and 2] and lens 3 of FIGS. 1 and 2 are attached to separate fittings 9 and 10, respectively; and (c) fittings 27 and 28 in FIGS. 3 and 4 join together in such a manner that the precise distance between lens 22 and lasant material 23 can be empirically optimized.

We claim:
1. An optically pumped laser comprising:
  (a) solid state component means for generating laser light, said solid state component means comprising a plurality of solid state components which include a solid lasant material and solid state optical pumping means for optically pumping said lasant material; and
  (b) fitting means for arranging the components with respect to one another along an optical path within predetermined tolerances, said fitting means comprising a plurality of complementary configured fittings which are interlockingly coupled to each other and positioned on said components.

2. The optically pumped laser of claim 1 wherein at least one of said fittings is positioned on two or more of said components.

3. The optically pumped laser of claim 1 wherein said fittings are comprised of at least one material selected from the group consisting of metals, ceramics, glass, thermoplastic materials and thermosetting materials.

4. The optically pumped laser of claim 3 wherein at least one of the components is a passive optical component and both it and its associated fitting are fabricated from the same material which is selected from the group consisting of thermoplastic materials and glass.

5. The optically pumped laser of claim 3 wherein said fittings are comprised of at least one thermoplastic material and at least one of said components is attached to its associated fitting by injection molding the fitting around it.

6. The optically pumped laser of claim 1 wherein said fittings are joined together within a housing.

7. The optically pumped laser of claim 6 wherein said housing is substantially tubular in shape.

8. The optically pumped laser of claim 6 wherein said housing is comprised of at least one material selected from the group consisting of metals, plastics and ceramics.

9. The optically pumped laser of claim 1 wherein said optical pumping means is comprised of at least one laser diode.

10. The optically pumped laser of claim 9 wherein said laser diode is comprised of gallium aluminum arsenide and said lasant material is a neodymium-doped yttrium aluminum garnet.

11. The optically pumped laser of claim 1 wherein said optical pumping means is comprised of at least one light-emitting diode.

12. The optically pumped laser of claim 1 wherein said optical pumping means is comprised of at least one laser diode array.

13. The optically pumped laser of claim 1 wherein said lasant material is comprised of a glass optical fiber which is doped with ions of a rare earth metal.

14. The optically pumped laser of claim 1 which comprises as an additional component, optical means for focusing light from said optical pumping means onto said lasant material.

15. The optically pumped laser of claim 14 wherein light from said optical pumping means is focused onto an end of a rod of said lasant material.

16. The optically pumped laser of claim, 14 wherein light from said optical pumping means is focused onto an end of a fiber of said lasant material.

17. The optically pumped laser of claim 14 wherein said optical means for focusing light from said optical pumping means is a gradient index lens.

18. The optically pumped laser of claim 1 which comprises as an additional component, a nonlinear optical material through which output radiation from said lasant material is passed and wherein said nonlinear optical material is effective to modify the frequency of said output radiation from the lasant material.

19. The optically pumped laser of claim 18 wherein said nonlinear optical material is effective to frequency double said output radiation from the lasant material.

20. The optically pumped laser of claim 18 wherein said lasant material is neodymium-doped yttrium aluminum garnet and said nonlinear optical material is potassium titanyl phosphate.

21. The optically pumped laser of claim 1 which comprises as an additional component, optical means for collimating the output radiation of said laser.

22. The optically pumped laser of claim 1 wherein said fitting means comprises at least one set of threadedly engaging fittings.

23. The optically pumped laser of claim 1 wherein said fitting means comprises at least one set of telescopically engaging fittings.

24. The optically pumped laser of claim 1 wherein at least one of said fittings comprises a male member and at least one other of said fittings comprises a female member for receiving said male member.

25. A method for making a multi-component optically pumped solid state laser which comprises:
(a) inserting the components of said laser into a plurality of complementary configured interlocking fittings, wherein said components comprise a solid lasant material and solid state optical pumping means for optically pumping said lasant material;
(b) joining the fittings together whereby said components are positioned with respect to one another along an optical path within predetermined tolerances; and
(c) bonding said fittings to each other.

* * * * *

UNITED STATES PATENT OFFICE
CERTIFICATE OF CORRECTION

Patent No. 4,730,335                     Dated    March 8, 1988

Inventor(s)  John H. Clark and Dennis L. Werth

It is certified that error appears in the above-identified patent and that said Letters Patent are hereby corrected as shown below:

Column 10, line 28, "in shape," should read --in shape.--

Column 10, line 56, "claim, 14" should read --claim 14--.

Signed and Sealed this

Second Day of August, 1988

*Attest:*

DONALD J. QUIGG

*Attesting Officer*          *Commissioner of Patents and Trademarks*